United States Patent [19]

Falterman

[11] Patent Number: 4,840,404
[45] Date of Patent: Jun. 20, 1989

[54] SEAT BELT SYSTEM HAVING SHOULDER HEIGHT SUPPORT

[76] Inventor: Wesley E. Falterman, 40565½ E. Stetson Ave., Hemet, Calif. 92344

[21] Appl. No.: 225,163

[22] Filed: Jul. 28, 1988

[51] Int. Cl.⁴ .............................................. B60R 21/10
[52] U.S. Cl. .................................... 280/808; 297/483; 297/486
[58] Field of Search ................ 280/801, 808; 297/483, 297/486, 468

[56] References Cited

U.S. PATENT DOCUMENTS

| | | | |
|---|---|---|---|
| 3,637,259 | 1/1972 | Rothschild | 297/385 |
| 3,834,730 | 9/1974 | Kansier | 280/808 |
| 3,860,261 | 1/1975 | Takada | 280/808 |
| 4,236,755 | 12/1980 | Pollitt et al. | 297/483 |
| 4,243,266 | 1/1981 | Anderson | 297/483 |
| 4,289,352 | 9/1981 | Ashworth | 297/473 |
| 4,461,510 | 7/1984 | Cunningham et al. | 297/250 |
| 4,609,205 | 9/1986 | McKeever | 280/808 |
| 4,648,625 | 3/1987 | Lynch | 280/808 |

Primary Examiner—Kenneth R. Rice
Attorney, Agent, or Firm—Sheldon & Mak

[57] ABSTRACT

A vehicle seat belt system has an auxiliary belt that is anchored behind the seat, the belt having a free end than can be connected to a selected location along a diagonal portion of a main belt for supporting the main belt proximate a user's shoulder.

17 Claims, 1 Drawing Sheet

SEAT BELT SYSTEM HAVING SHOULDER HEIGHT SUPPORT

BACKGROUND

The present invention relates to vehicle seat belts and more particularly to vehicle seat belt system having a diagonal belt element.

Conventional vehicle seat belt systems have an elongate belt that extends from an anchored emergency locking retractor above and to one side of the seat, the belt extending diagonally downward to a releasable lower anchor at an opposite side of the seat, thence across the seat to a permanent lower anchor on the same side as the retractor. Typically, the releasable anchor is slidably connected to the belt for automatic adjustment equalizing the belt tension on opposite sides of the releasable anchor.

A problem with these conventional seat belt systems is that the diagonal portion of the belt can be ineffective in restraining an occupant of the vehicle during a collision, particularly when a collision impact occurs at an oblique angle to a longitudinal axes of the vehicle. This problem is compounded in many larger vehicles wherein the retractor is located at door height some distance from both the back of the seat and an occupant's shoulder. A further problem is that upper body support with the conventional systems is diminished even more when the occupant is of less than average height and build.

A further development is the use of some form of connection to the diagonal belt portion between the retractor and the releasable anchor. See, for example, U.S. Pat. No. 3,860,261 to Takaba that discloses a floor-mounted retractor, the belt extending upwardly to an anchored roller, thence diagonally downwardly to the releasable anchor, the upwardly extending portion of the belt having a ring member fixed thereon and enclosing the diagonal portion at a point proximate the seat back. See also U.S. Pat. Nos. 4,236,755 to Pollitt et al., 4,243,266 to Anderson, and 4,289,352 to Ashworth, each disclosing an auxiliary belt that extends from the bottom of the seat back upwardly along the forward portion of the seat back to a point of attachment with the diagonal belt portion proximate the top of the seat back, the auxiliary belt extending over the top of the seat back to an attachment. Anderson and Pollitt et al. disclose the attachment of the auxiliary belt to an anchor for the upper retractor. Ashworth, on the other hand, has the auxiliary belt enclosing the seat back, its ends being connected together. However, the above-disclosed seat belt systems exhibit one or more of the following disadvantages:

1. The auxiliary belt passing along the front of the seat back is unsightly and dangerous in that a user's arm fingers or arm can be injured by being caught between the auxiliary belt and the seat back as the user is entering or leaving the vehicle;
2. They are ineffective that the diagonal belt portion is not adequately supported proximate the user's shoulder;
3. They are awkward in that they require difficult adjustments;
4. They are expensive to produce in that they require numerous connections and attachments; and
5. They are difficult to install, particularly as a retrofit to an existing system, because they require expensive disassembly of an existing system and/or modifications thereto that are not practical in the field.

Thus there is a need for a seat belt system that is effective in retaining a seated vehicle occupant in the event of a collision, whether straight on or at an oblique angle, that is inexpensive to produce as either a complete system or as a retrofit, and easy to both use and install.

SUMMARY

The present invention is directed to a vehicle seat belt apparatus and method that meets this need. In one aspect of the invention the apparatus includes a first belt retractably anchored to the upper anchor and connected to the lower anchor at the first side of the seat, coupling means connected to the lower anchor at the second side of the seat, releasable buckle means on the first belt for engaging the latch means, rear anchor means below and behind the seat, a second belt anchored to the rear anchor means and having free end, and means for releasably connecting the free end of the second belt to the first belt between the buckle means and the upper anchor means with the second belt supported by the top of the seat back. The second belt advantageously stabilizes the first belt proximate a user's shoulder for effective restraint of the user, and especially his upper body, in the event of a collision. The releasable connection of the second belt can include receptacle means fixed on the first belt and latch means on the second belt for engaging the receptacle means. Preferably there are a plurality of the receptacle means for connection to a selected location along the first belt. Preferably the receptacle means can include a grommet for forming a reinforced opening in the first belt. The grommet provides a particularly effective and low cost means for forming discrete attachment points along the first belt with minimal effect on the load-carrying capacity of the belt.

The latch means can include a hook member connected to the free end of the second belt, the hook member being adapted for protruding the grommet. Preferably the latch means further includes a biased moveable member for releasably preventing withdrawal of the hook member from the grommet.

In another aspect of the present invention, the means for releasably connecting the second belt to the first belt can include a loop member formed in the second belt, and releasable fastener means for closing the loop member about the first belt. In a further aspect, the means for releasably connecting the second belt can include releasable clamp means for griping the first belt at a selected location thereon.

The present invention can also be provided as a kit for modifying a seat belt apparatus having the upper and lower anchor means, the first belt, the latch means, and the buckle means on the first belt, the kit including the rear anchor means, the second belt for anchoring to the rear anchor means, and the means for releasably connecting the free end of the second belt to the first belt. The kit can further include a plurality of grommets for mounting in the first belt between the buckle means and the upper anchor means, and the latch means on the second belt for selectively engaging the grommets. Also, the latch means can include a hook member for protruding a selected grommet. The kit can further include tool means for installing the grommets.

In another aspect, the kit can include the loop member formed in the second belt and a releasable member for closing the loop member about the first belt. In a further aspect, the kit can include the releasable clamp means on the second belt for griping the first belt.

The present invention also provides a method for modifying a vehicle seat belt apparatus having a first belt connected between upper and lower anchor means, * The method can include a further step of installing a grommet for forming a reinforced opening in the first belt, the latch means including a hook member for protruding a grommet.

DRAWINGS

These and other features, aspects, and advantages of the present invention will become better understood with reference to the following description, appended claims, and accompanying drawings where:

DESCRIPTION

Figures 1, 2:
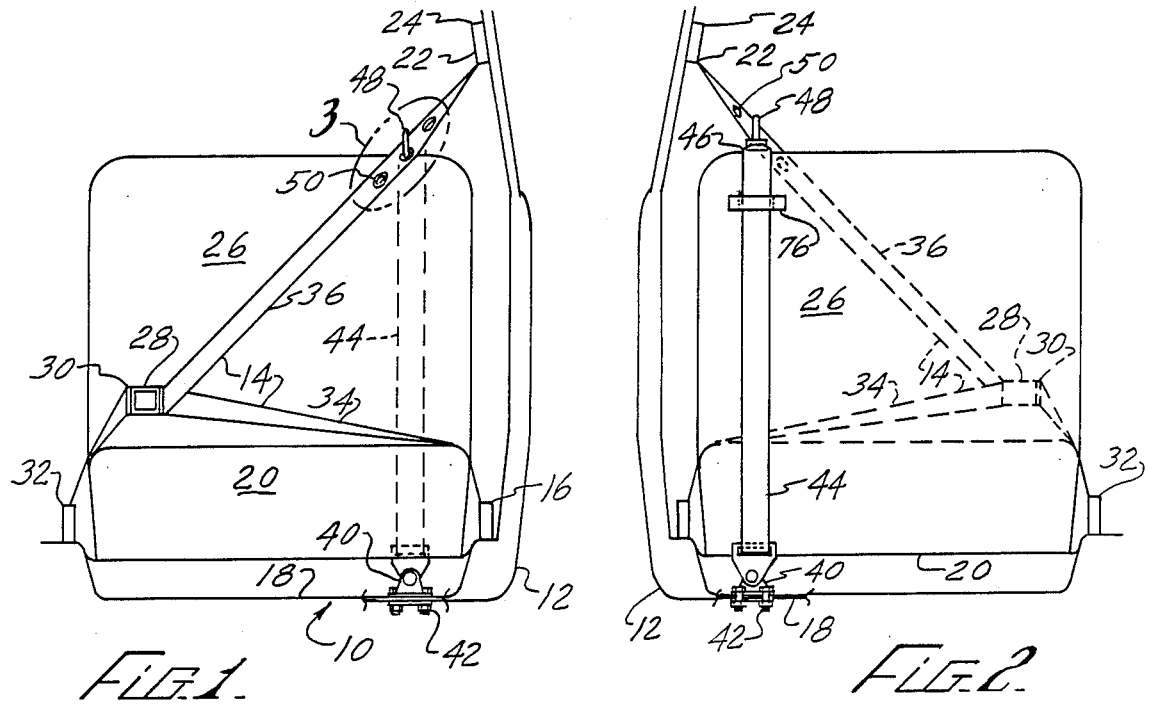
FIG. 1 is a front fragmentary sectional elevational view of a vehicle seat belt system according to the present invention.
FIG. 2 is a rear fragmentary sectional elevational view of the seat belt system of FIG. 1.

The present invention is directed to a vehicle seat belt system having a diagonal belt element and an auxiliary support for the diagonal belt element. With reference to the drawings, and especially FIGS. 1-3 and 5 in particular, a seat belt apparatus 10 for a vehicle 12 includes an elongate first belt 14 that is connected at one end thereof to a first anchor 16, the first anchor 16 being located proximate a floor member 18 of the vehicle 12 and at one side of a seat 20. The other end of the belt 12 is connected to a safety retractor mechanism 22 in a conventional manner at an upper anchor 24, the upper anchor 24 being located on the vehicle 12 above and behind a back 26 of the seat 20. A buckle 28, slidably engaging the first belt 14, releasably engages a connector member 30, the connector member 30 being anchored to the vehicle 12 by a second a second anchor 32, the second anchor 32 being located opposite the seat 20 from the first anchor 16. With the buckle 28 connected to the connector member 30, the first belt 14 forms a lap portion 34 and a diagonal portion 36, the diagonal portion 36 extending between the buckle 28 and the retractor mechanism 22.

Figure 3:
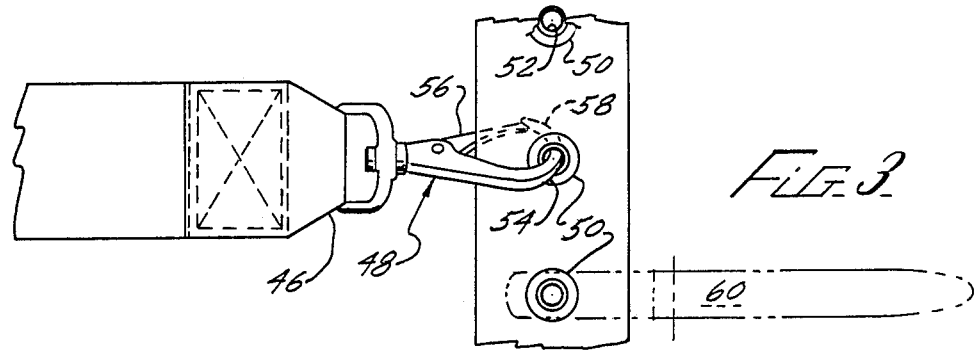
FIG. 3 is a fragmentary detail plan view of the apparatus of FIG. 1 within region 3 of FIG. 1.

According to the present invention, the apparatus 10 further includes a rear anchor 40 that is rigidly connected to the floor member 18 by fastener means 42, the rear anchor 40 being located behind the seat 20. A second belt 44 is connected at one end thereof to the rear anchor 40, the second belt 44 having a free end 46 for connection to the diagonal portion 36 of the first belt 14. For this purpose, the free end 46 is equipped with a hook latch 48 for selectively engaging one of a plurality of grommets 50 that are fastened to the first belt 14. As best shown in FIG. 3, each grommet 50 functions as a receptacle for the hook latch 48, providing a reinforced opening 52 in the first belt 14. The hook latch 48, which can be a conventional hardware item, has a hook member 54 for protruding the opening 52 and a biased movable latch member 56, the combination of the hook member 54 and the latch member 56 forming a loop 58, the loop 58 enclosing a portion of the first belt 14 when the hook latch 48 is connected to the grommet 50. As also shown in FIG. 3, the grommet 50 are installed at desired locations along the first belt 14 by means of a conventional crimping tool 60.

Figures 4, 5:
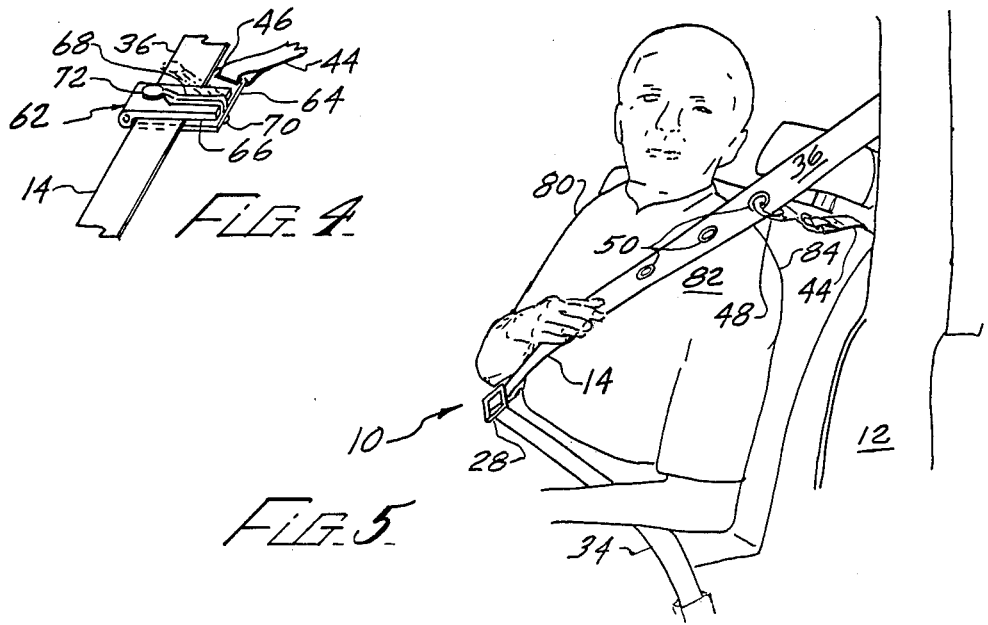
FIG. 4 is a fragmentary detail oblique perspective view within region 3 of FIG. 1, showing an alternative configuration of the apparatus of FIG. 1.
FIG. 5 is a oblique perspective view of the apparatus of FIG. 1 in use restraining a vehicle occupant.

With further reference to FIG. 4, an alternate configuration of the seat belt apparatus 10 has, in place of the hook latch 48 and the grommets 50, a clamp latch assembly 62 for gripping the first belt 14 at a selected location along the diagonal portion 36. The clamp latch assembly 62 includes a base member 64 that is attached to the free end 46 of the second belt 44, a cover member 66 swingably connected to the base member 64, and a latch member 68, the latch member 68 being pivotably connected to the cover member 66 and having a pawl portion 70 for engaging the base member 64, the latch member 68 also having a handle 72 for moving the latch member 68 between an open position and a closed position. In the open position, the cover member 66 can be swung apart from the base member 64 for accepting the first belt 14 therebetween. With the cover member 66 closed and positioned at a desired location along the first belt 14, movement of the latch member 68 from the open position to the closed position clamps the first belt 14 between the cover member 66 and the base member 64, a high level of clamping force being developed by cam action between the pawl member 70 and the base member 64.

As best shown in FIG. 5, the apparatus 10 of the present invention provides an effective restraint for an occupant 80 of the vehicle 12, in that the connection of the second belt 44 to the diagonal portion 36 of the first belt 14 provides an auxiliary support for the first belt 14 that enhances restraint of the occupant 80 in the event of a collision. This is especially true with respect to an upper body portion 82 of the occupant 80 in that the hook latch 48 can be selectively connected to a grommet 50 proximate a shoulder 84 of the occupant 80, the location of the attachment to the first belt 14 being selected depending on the shoulder height of the occupant 80 and the necessary length of the diagonal portion 36 of the first belt 14 between the point of attachment and the buckle 28, plus the length of the lap portion 34.

If desired, the hook latch 48 can be left connected to the selected grommet 50 when the occupant 80 leaves the vehicle 12, remaining connected until the occupant 80 again uses the vehicle 12. The hook latch 48 can also be disconnected when the apparatus 10 is not in use, the second belt 44 being retained in position by a strap 76 that is attached to the back 26 of the seat 20 proximate the top thereof. The strap 76 can be fixed to the seat 20 by a suitable adhesive (not shown) or sewn in place.

The present invention can also be provided as a kit for modifying an existing seat belt installation that includes the first belt 14, the first anchor 16, the retractor mechanism 22 and upper anchor 24, the second anchor 32, the connector member 30 and the buckle 28, the first belt 14 forming the lap portion 34 and diagonal portion 36 as described above. According to the present invention, the kit includes the rear anchor 40, the fastener means 42, the second belt 44 with the hook latch 48, and a plurality of grommets 50 for mounting in the diagonal portion 36 of the first belt 14. The kit can also include the crimping tool 60 for facilitating the modification. The kit can further include the strap 76 for mounting to the rear of the seat back 26 proximate the top thereof, and a suitable adhesive or fastener to facilitate the mounting.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A seat belt apparatus for a vehicle having lower anchor means at first and second sides of a seat of the vehicle, and an upper anchor means at the first side of the seat above and behind a back of the seat, the apparatus comprising:
   (a) a first belt anchored to the anchor means at the first side of the seat and retractably anchored to the upper anchor means;
   (b) coupling means connected to the lower anchor means at the second side of the seat;
   (c) buckle means on the first belt, the buckle means being adapted for releasable engagement with the latch means;
   (d) rear anchor means below and behind the seat;
   (e) a second belt anchored to the rear anchor means and having a free end; and
   (f) means for releasably connecting the free end of the second belt to the first belt between the buckle means and the upper anchor means with the second belt in supportive contact with the top of the seat back.

2. The apparatus of claim 1 wherein the means for releasably connecting the second belt comprises receptacle means fixed on the first belt and latch means on the second belt for engaging the receptacle means.

3. The apparatus of claim 2 comprising a plurality of the receptacle means for permitting connection of the second belt at a selected location along a first belt.

4. The apparatus of claim 2 wherein the receptacle means comprises a grommet forming a reinforced opening in the first belt.

5. The apparatus of claim 4 wherein the latch means on the second belt comprises a hook member for protruding the grommet.

6. The apparatus of claim 5 further comprising a moveable member on the latch means, the movable member being biased for releasably preventing withdrawal of the hook member from the grommet.

7. The apparatus of claim 1 wherein the means for releasably connecting comprises a loop member formed in the second belt, and a releasable member for closing the loop member about a portion of the first belt.

8. The apparatus of claim 1 wherein the means for releasably connecting comprises releasable clamp means on the second belt for gripping the first belt at a selected location thereon.

9. A seat belt apparatus for a vehicle having lower anchor means at first and second sides of a seat of the vehicle, and an upper anchor means at the first side of the seat above and behind a back of the seat, the apparatus comprising:
   (a) a first belt anchored to the anchor means at the first side of the seat and retractably anchored to the upper anchor means;
   (b) coupling means connected to the lower anchor means at the second side of the seat;
   (c) buckle means on the first belt, the buckle means being adapted for releasable engagement with the latch means;
   (d) rear anchor means below and behind the seat;
   (e) a second belt anchored to the rear anchor means and having a free end; and
   (f) means for releasably connecting the free end of the second belt to the first belt between the buckle means and the upper anchor means, comprising:
      (i) receptacle means fixed on the first belt, comprising a plurality of grommets, each grommet forming a reinforced opening in the first belt;
      (ii) latch means on the second belt for engaging a selected one of the grommets, the latch means comprising a hook member for protruding the selected grommet and a moveable member proximate the hook member, the moveable member being biased for releasably preventing withdrawal of the hook member from the grommet.

10. A kit for modifying a seat belt apparatus for a vehicle having lower anchor means at first and second sides of a seat of the vehicle, an upper anchor means at the first side of the seat above and behind a back of the seat, a first belt anchored to the anchor means at the first side of the seat and retractably anchored to the upper anchor means, latch means connected to the lower anchor means at the second side of the seat, and buckle means on the first belt, the buckle means being adapted for releasable engagement with the latch means, the kit comprising:
   (a) rear anchor means below and behind the seat;
   (b) a second belt anchored to the rear anchor means and having a free end; and
   (c) means for releasably connecting the free end of the second belt to the first belt between the buckle means and the upper anchor means.

11. The kit of claim 10 wherein the means for releasably connecting the second belt comprises:
   (a) receptacle means comprising a plurality of grommets for mounting in the first belt between the buckle means and the upper anchor means and forming reinforced openings in the first belt; and
   (b) latch means on the second belt for selectively engaging the grommets.

12. The kit of claim 11 wherein the latch means on the second belt comprises a hook member for protruding a selected grommet.

13. The kit of claim 11 further comprising tool means for installing the grommets.

14. The kit of claim 10 wherein the means for releasably connecting comprises a loop member formed in the second belt, and a releasably member for closing the loop member about a portion of the first belt.

15. The kit of claim 10 wherein the means for releasably connecting comprises releasable clamp means on the second belt for gripping the first belt at a selected location thereon.

16. A method for modifying a seat belt apparatus for a vehicle having upper and lower anchor means and a first belt connected therebetween, the method comprising the steps of:
   (a) providing rear anchor means below and behind the seat; and
   (b) providing a second belt, the second belt having a free end, and means for releasably connecting the free end of the second belt to the first belt between the buckle means and the upper anchor means.

17. The method of claim 16 comprising the further step of installing a grommet for forming a reinforced opening in the first belt; and wherein the latch means on the second belt comprises a hook member for protruding the grommet.

* * * * *